United States Patent [19]

Vidovic

[11] 3,806,794

[45] Apr. 23, 1974

[54] PHASE SHIFTER WITH SINGLE POTENTIOMETER CONTROL

[75] Inventor: Nikola Vidovic, Santa Clara, Calif.

[73] Assignee: International Video Corporation, Sunnyvale, Calif.

[22] Filed: Apr. 30, 1973

[21] Appl. No.: 355,781

[52] U.S. Cl. .................. 323/119, 307/262, 323/125, 328/155

[51] Int. Cl. .......................... H03b 3/04, H03l 11/00

[58] Field of Search ........... 323/119, 121, 124, 125; 307/262; 328/155; 315/194, 195, 198, 199

[56] References Cited

UNITED STATES PATENTS

| | | | |
|---|---|---|---|
| 3,445,756 | 5/1969 | Rooney, Jr. | 323/119 |
| 3,527,964 | 9/1970 | Hansen et al. | 328/155 X |
| 3,566,284 | 2/1971 | Thelen | 328/155 |

OTHER PUBLICATIONS

"Circuit Providing Phase Shift Which is Variable With Frequency" IBM Tech. Disc. Bull.; Vol. 12, No. 5, Oct. 1969, Pg. 718.

"A Wide-Range RC Phase-Shift Oscillator" by Fraser, Electronic Engnr.; May 1956, Pgs. 200-202.

*Primary Examiner*—Gerald Goldberg

*Attorney, Agent, or Firm*—Limbach, Limbach & Sutton

[57] ABSTRACT

Apparatus for controllably shifting the phase of a signal of a given frequency by at least 360° by means of a single potentiometer control. A pair of emitter follower configured transistors are associated with two frequency dependent feedback paths having a common capacitor and each including a complementary portion of the control potentiometer. The transistor pair is followed by a compensating arrangement for modifying the circuit transfer characteristic to provide a characteristic of the general form $$[R(x) - jI(x)]/[R(x) + jI(x)]$$

which provides a greater than 360° phase shift when the term $R(x)$ changes sign as $x$ varies.

5 Claims, 4 Drawing Figures

PHASE SHIFTER WITH SINGLE POTENTIOMETER CONTROL

BACKGROUND OF THE INVENTION

This invention relates to phase shifting circuits and more particularly to a circuit for controllably shifting the phase of an input signal at a given frequency over a range of greater than 360° by adjustment of a single control.

There are many applications in which control over the phase of a signal is required. One exemplary application is in the processing of composite color television signals where it is necessary to shift the phase of the color subcarrier (at 3.58MHz in the NTSC system; 4.43MHz in the PAL and SECAM systems) in order to achieve and preserve a true color transmission within the composite color video signal. It is necessary to have at least a 360° controllable variation in the subcarrier burst phase in order to correct for all possible phase discrepancies. Presently used circuits which perform this function are complex and expensive and very often require special components.

SUMMARY OF THE INVENTION

In accordance with the teachings of this invention a circuit receives a signal at a given frequency and by control of a single potentiometer the signal phase can be shifted over a range greater than 360°. In order to achieve a phase shift greater than 180° it is necessary to provide a circuit which has a transfer function in which the real part thereof changes sign. In a preferred embodiment of the invention this is achieved by a pair of emitter follower (common collector) configured transistors having two frequency dependent feedback paths involving the two complementary parts of a potentiometer, and a common capacitor, which, in effect, becomes a variable capacitor. Thus as the wiper position of the potentiometer is varied the real part of the transfer characteristic becomes positive or negative while the imaginary part changes from zero to some finite value and then back to zero. The invention and its attendant advantages will be better understood as the detailed description and drawings are read and understood.

DESCRIPTION OF THE PREFERRED EMBODIMENTS

Figure 1:
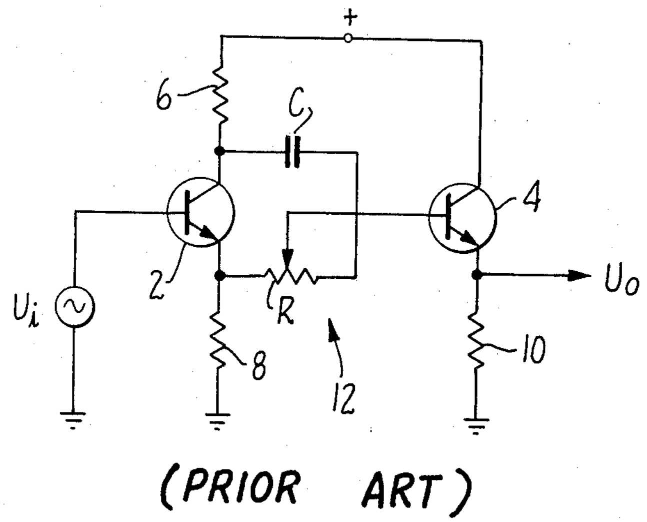
(PRIOR ART) FIG. 1.
FIG. 1 is a schematic circuit diagram showing a prior art 180° phase shifter circuit.

In order to better understand the present invention, reference is first made to a conventional prior art 180° phase shifter circuit as shown in FIG. 1. More specifically, the circuit of FIG. 1 is capable of a maximum phase shift of 180° depending on circuit values. A pair of NPN transistors 2 and 4 are arranged in a simple emitter follower configuration with the input signal $U_i$ applied to the base of transistor 2. Resistors 6, 8 and 10 are conventional biasing resistors. An RC network 12 is connected between transistors 2 and 4: a capacitor C is connected from the collector of transistor 2 to the base of transistor 4; a potentiometer R is connected between the emitter of transistor 2 and the base of transistor 4. The output $H_o$ is taken at the emitter of transistor 4. The transfer function $T(\omega)$ for this circuit is therefore:

$$T(\omega) = U_o/U_i = (1 - j\omega RC)/(1 + j\omega RC)$$

and thus the phase shift $\phi$ is given by $\phi = 2$ arc tangent $\omega$RC. For $R = O$, $\phi = 0°$ and the circuit reduces to two emitter followers. For $R = \infty$, $\phi = 180°$ and the circuit reduces to an inverter and an emitter follower. Thus the maximum phase shift is 180°. This is because the real part of the transfer function $T(\omega)$ is constant. In order to provide a larger range of phase shift it is necessary for the real part of the transfer function to change its sign as explained further below.

Figure 2:
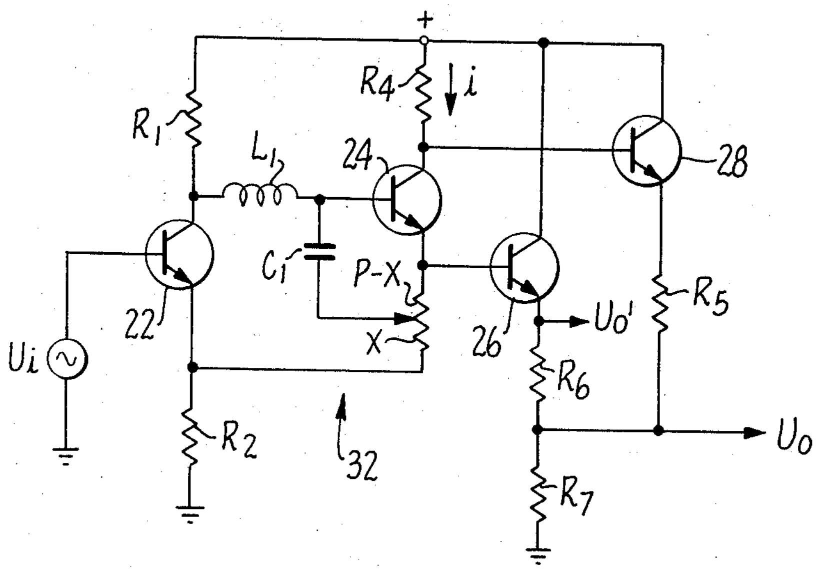
FIG. 2 is a schematic circuit diagram of an embodiment of the present invention.

Referring now to FIG. 2 wherein one preferred embodiment of the present invention is shown. A pain of NPN transistors 22 and 24 are arranged in an emitter follower configuration with an impedance network between them in a manner similar to FIG. 1. A further emitter follower transistor 26 is connected to transistor 24 and a current amplifier transistor 28 is also connected to transistor 24.

The input signal $U_i$ at a given frequency is applied to the base of transistor 22. A positive voltage source is connected to the collector of transistor 22 through a resistor $R_1$, to the collector of transistor 24 through a resistor $R_4$ and to the collectors of transistors 26 and 28. The emitter of transistor 22 is connected to ground through resistor $R_2$. The collector of transistor 24 is connected to the base of transistor 28. The transistor 24 emitter is connected to the base of transistor 26. The emitter of transistor 26 provides $U_o'$ output and is further connected to ground through resistors $R_6$ and $R_7$. The output $U_o$ is connected to the junction of $R_6$, $R_7$ and to the emitter of transistor 28 through resistor $R_5$.

The impedance network 32 between transistors 22 and 24 includes an inductor $L_1$ between the collector of 22 and the base of 24, a potentiometer P between the emitter of 24 and the emitter of 22 with its wiper connected through a capacitor $C_1$ to the base of 24. The network therefore establishes two feedback paths: from the collector of 22 through $L_1$, $C_1$ and a portion of potentiometer P designated X to the emitter of 22; and from the emitter of 24 through the remaining part of potentiometer P designated P–X through $C_1$ to the base of 24. Thus both paths include $C_1$ and the resistance in each depends on the adjustment of potentiometer P. The two feedback paths are each frequency dependent due to the reactive elements $L_1$ and $C_1$. The latter loop (from the emitter of 24) transfers the fixed capacitor $C_1$ into a variable capacitor whose capacitance $C_v$ may be expressed as $$C_v = C_l\, P\text{–}X/P\ ,$$

where $C_1$ also represents the capacitance of capacitor $C_1$ and $P\text{–}X/P$ expresses the ratio of potentiometer resistance in the feedback path to the total resistance of the potentiometer P.

It follows that the transfer characteristic for the $U_o'$ output (at the emitter of 26) as a function of the potentiometer position $X$ is $$T'(x)=\frac{U_o'}{U_i}=\frac{-R_1-P\frac{R_1}{R_2}-\omega^2L_1C_1(P-X)-j\omega C_1X(P-X)}{P-R_1-\omega^2L_1C_1(P-X)+j\omega C_1X(P-X)}$$

As mentioned above, the desired transfer function should have a real part which changes sign as the variable is changed so that a 360°phase shift is attainable. Thus the general form of the transfer function should be $$[R(x)-jI(x)]/[R(x)+jI(x)].$$

Thus, the transfer function $T'(x)$ is not sufficient because the real part of the expression in the numerator is not the same as the real part of the epxression in the denominator.

What is needed is to compensate the $T'(x)$ transfer characteristic at $U_o'$ to provide the desired transfer characteristic at $U_o$:

$$T(x) = [P-R_1-\omega^2L_1C_1\ (P-X) - j\omega C_1X(P-X)]/[P-R_1-\omega^2L_1C_1\ (P-X)+j\omega C_1X(P-X)]$$

This expression for $T(x)$ provides a 360° or greater phase shift as $x$ is varied from O to P in value as will be explained further below.

The compensation of $T'(x)$ to get $T(x)$ is accomplished by multiplying the transfer function $T'(x)$ times a compensating term. In terms of the general form of the transfer function, $T'(x)$ is (roughly):

$$[-R(x)-jI(x)]/[R(x)+jI(x)]$$

and the required compensation is $$[2R(x)]/[R(x)+jI(x)].$$

With reference to the circuit of FIG. 2, this compensation is achieved by the current $i$:

$$T(x) = T'(x) - \alpha i,$$

where $\alpha$ is the transistor 24 gain factor.

The relationship between $U_o$ and $U_o'$ depends on certain resistor values and the current $i$:

$$U_o = [(R_5\ R_7)/(R_5R_6+R_6R_7+R_5R_7]\ [U_o' - (R_4R_6/R_5)\ i].$$

Thus, the circuit values can be chosen to provide the desired 360° phase shift range for a given frequency $\omega$ as explained below.

In order to get the least change in amplitude at the output and make $\alpha = 2P$, the following relationship between resistors must be fulfilled:

$$R - R_1 = R_2 \text{ and } R_4R_6/R_5 = P$$

Substituting all these values into equation for transfer function $T(x)$ yields $$T(x) = (R_4R_7)/[R_4R_7 + P(R_4+R_7)]\ [P-R-\omega^2L_1C_1.(P-X)-j\omega C_1X(P-X)]/[P-R-\omega^2L_1C_1(P-X)+j\omega C_1X(P-X)] \quad (1)$$

Values $P_1R$ and $\omega^2L_1C_1$ should be so chosen for a particular operating frequency $\omega$ so that the real part $[P-R-\omega^2L_1C_1\ (P-X)]$ changes sign when $X$ changes from $O$ to $P$. One particular case would be $\omega^2L_1C_1 = 1$, $R - P/2$, $R_7 = 2P$ which yields:

$$T(x)=\frac{1}{2}\,\frac{\frac{X}{P}-\frac{1}{2}-j\frac{X}{P}\left(1-\frac{X}{P}\right)}{\frac{X}{P}-\frac{1}{2}+j\frac{X}{P}\left(1-\frac{X}{P}\right)} \quad (2)$$

$$T(x) - \tfrac{1}{2}\, e^{-j\phi} \quad (3)$$

$$\phi=2 \text{ arc tangent } \frac{\frac{X}{P}\left(1-\frac{X}{P}\right)}{\frac{X}{P}-\frac{1}{2}} \quad (4)$$

Figure 4:
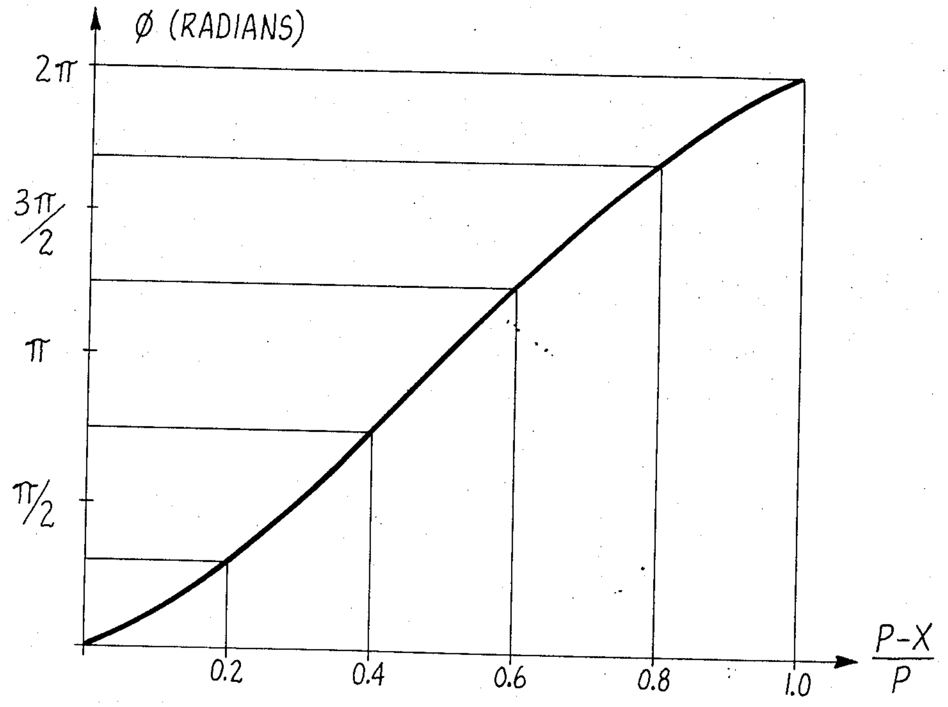
FIG. 4 is a graphical presentation showing the phase shift of FIG. 1 in relation to the setting of the potentiometer control.

The phase shift $\phi$, equation 4, versus $P-X/P$ is shown in FIG. 4. As can be seen, it is a fairly linear relationship.

Due to parasitic capacitance between the collector and base of each transistor, as well as stray capacitances between other components, it is not possible in actual working circuit to achieve the ideal response shown in equation 2. It has been found that in a working embodiment of the FIG. 2 circuit that the control range is about 330°.

Figure 3:
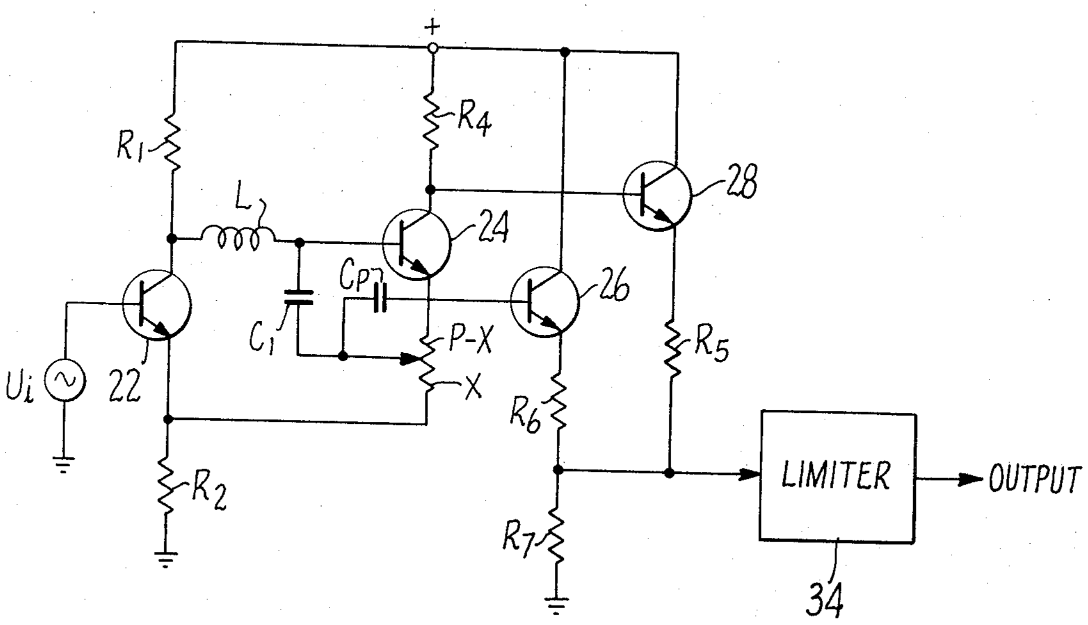
FIG. 3 is a schematic circuit diagram of a further embodiment of the present invention.

Thus in a modified embodiment as shown in FIG. 3 a capacitor $C_p$ is connected between emitter of 24 and the wiper of the potentiometer P. This capacitor produces additional phase shift (about 40° in this particular case) when $X = O$ so that total control range increases to 370°. This phase compensation introduces some amplitude change into the output voltage, hence, limiter stage 34 is added to stabilize the amplitude of the output voltage.

By way of example only and not to be considered limiting, the following circuit values were used in a working embodiment of the circuit of FIG. 3:

$R_1$ — 250Ω
$R_2$ — 250Ω
$R_4$ — 1KΩ
$R_5$ — 500Ω
$R_6$ — 1KΩ
$R_7$ — 1KΩ
$L_1$ — 18 μH
$C_1$ — 68 pf.
$C_p$ — 12 pf.
P — 500Ω

The invention thus described provides a simple, inexpensive means for shifting a signal of a given frequency over 360° in phase by the adjustment of a single potentiometer control.

Other modifications of the disclosed embodiments within the teachings of the invention will be apparent to those or ordinary skill in the art. The invention is therefore to be limited only by the scope of the appended claims.

I claim:

1. Apparatus for controllably shifting the phase of a signal at a given frequency over a range of at least 360° comprising first and second transistors arranged in a common collector configuration, means for applying said signal to said first transistor, impedance network means connected between said first and second transistors for providing first and second frequency dependent feedback paths associated with said first and second transistors, respectively, said feedback paths including a capacitor common to both paths connected to the wiper of a potentiometer having its complementary parts in each of said feedback paths, respectively, to provide a transfer function of the general form $$[-R(x)-jI(x)]/[R(x)+jI(x)]$$

where $R(x)$ and $I(x)$ are the real and imaginary portions of the function, respectively, and $R(x)$ is a function of the potentiometer wiper position and changes sign over the total excursion of the wiper movement, and means for compensating said transfer function to provide a transfer function of the general form $[R(x) - jI(x)]/[R(x) + jI(x)]$ whereby an output signal is provided having a controllable phase shift of at least 360° controlled by said potentiometer.

2. Apparatus according to claim 1 wherein said means for compensating comprises means connected to said second transistor for injecting a compensating current to said transistor of the general transfer function form $[2R(x)]/[R(x) + jI(x)]$.

3. Apparatus according to claim 2 wherein said input signal is applied to the base of said first transistor and said impedance network comprises an induction connected between the collector of said first transistor and the base of said second transistor, a potentiometer connected between the emitter of said second transistor and the emitter of said first transistor, and a capacitor connected between the base of said second transistor and the wiper of said potentiometer.

4. Apparatus according to claim 3 wherein said impedance network further comprises a capacitor connected between the wiper of said potentiometer and the emitter of said second transistor.

5. Apparatus according to claim 4 further comprising means for amplitude limiting said phase shifted output signal.

* * * * *